R. T. SMITH & J. K. PRIEST.
Improvement in Clipping-Shears.
No. 125,911. Patented April 23, 1872.
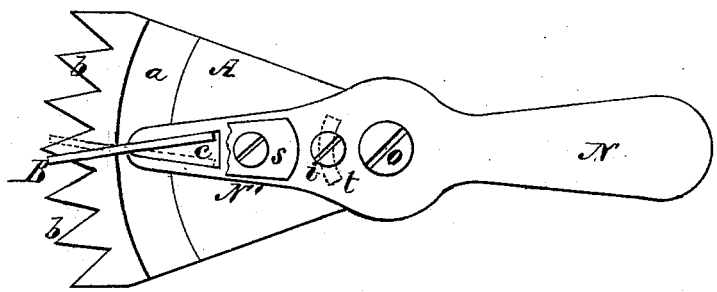
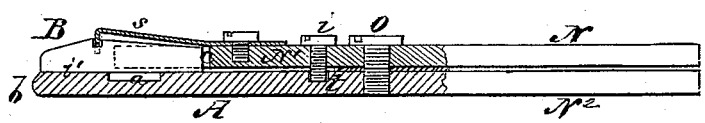
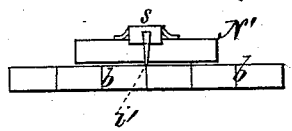 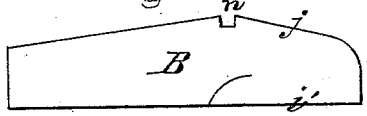 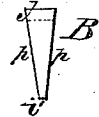
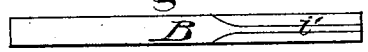
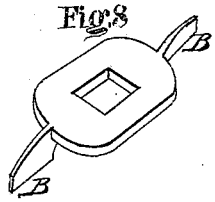
Witnesses.
R. F. Campbell
J. N. Campbell
Inventors
R. T. Smith
J. K. Priest
by
Mason, Fenwick & Lawrence 125,911

UNITED STATES PATENT OFFICE.

ROSWELL T. SMITH AND JOSEPH K. PRIEST, OF NASHUA, NEW HAMPSHIRE, ASSIGNORS TO THEMSELVES, WILLIAM EARL, AND J. G. BLUNT, OF SAME PLACE.

IMPROVEMENT IN CLIPPING-SHEARS.

Specification forming part of Letters Patent No. 125,911, dated April 23, 1872.

*To all whom it may concern:*

Be it known that we, R. T. SMITH and J. K. PRIEST, of Nashua, in the county of Hillsborough and State of New Hampshire, have invented a new and Improved Cutting-Device for Hand and Power Shears; and we do hereby declare that the following is a full, clear, and exact description thereof, reference being had to the accompanying drawing making part of this specification, in which—

Figure 1 is a top view of vibrating handshears having our improved cutter applied to them. Fig. 2 is a section taken longitudinally and centrally through the shears. Fig. 3 is an end view of the shears. Figs. 4, 5, and 6 are different views of the cutting device. Fig. 7 is a top view of another form of vibrating shears with our improved cutters applied. Fig. 8 is a perspective view of a rotary cutter for power-shears.

Similar letters of reference indicate corresponding parts in the several figures.

This invention relates to shears for shearing sheep and other animals wherein rotary or vibrating cutters are employed and operated either by hand or by mechanical power. The object of our invention is to combine with the teeth of the cutter-plate one or more upright cutters, presenting cutting-edges which are self-sharpening by being made so thin that the natural wear of them on the cutter-plate will keep them sharp, as will be hereinafter explained.

The following description of our invention will enable others skilled in the art to understand it.

In the accompanying drawing, Figs. 1, 2, 3, and 7 represent vibrating shears, and Fig. 8 represents a double cutter, which is adapted for rotary shears—that is to say, the cutter, Fig. 8, is a rotary cutter.

A represents the cutter-plate, which is constructed with a handle, N, and made of a segmental form, O being the axis-pin of the segment, and b b shearing-teeth of a triangular form, which are formed on the periphery of segment. In rear of these teeth is a groove, a, which is concentric to the axis-pin O, and which is made into the flat surface of the cutter-plate to allow a free clearance of hairs which may work back of the roots of the teeth b. On top of the cutter-plate A is a vibrating arm, N′, which extends back and is prolonged into a handle, N. This arm is pivoted to the cutter-plate at O, and a washer is introduced to prevent the arm and handle from bearing on the cutter-plate and its handle. A pin, i, plays in a concentric slot, t, in the cutter-plate, and serves as a stop for the parts to limit their vibration. A triangular opening, c, is made through the end of arm N′, and into this slot is placed the shank of a cutter, B, as shown in Figs. 1 and 2. The slot c allows the cutter B to vibrate independently of the vibration given to the arm N′ and to assume proper angles of the teeth on the cutter-plate A. By means of a spring, s, the cutter B is held down upon the cutter-plate on opposite sides of the groove a, and by means of a hook on the free end of this spring s, and a notch, n, in the upper edge of the cutter, this cutter will be prevented from end play. The shears represented in Fig. 7 present a great number of cutters, B, on the periphery of the upper plate, which cutters are all formed on this plate, and held down by a single central spring, which is applied to the central pivot o. In Fig. 8 a shank is represented with two cutters, B B, formed on its ends, and with a square hole through it. This cutter is intended for rotary shears, wherein the cutter-plate presents shearing-teeth entirely around its periphery. The cutters B of the three different forms of shears described are all made alike in respect to their cutting-edges, and we will now explain the peculiarity of these cutters, it being understood that they may be made detachable from their arm or plate, as in Figs. 1. 2, and 3, or they may be formed on said arm or plate, as in Fig. 7. That portion of the cutter B which slides upon the surfaces of the shearing-teeth b presents a narrow flat surface or edge i′, which is produced by beveling the sides p p of the blade from the upper edge j downward and inward. In this way narrow working-edges are obtained without sacrificing the proper strength of the blade and without rendering the blade so thin that it would be liable to bend while in operation.

We are aware that shear-cutters have been made before our invention which presented flat surfaces, and double or right-and-left cutting-edges to shearing-blades, and this we do not claim, for such cutters were not so constructed that their edges would be kept sharp by the natural wearing away of their flat surfaces.

We have described an upright cutter, the lower edge of which is reduced to such a degree of thinness that in its operation on the cutter-plate the narrow edge will wear away in about an equal ratio to the work done by it.

What we claim as new, and desire to secure by Letters Patent, is—

The upright shearing-cutter B, presenting a narrow self-sharpening cutting-edge, $i'$, to the cutter-plate, substantially as described.

ROSWELL T. SMITH.
JOSEPH K. PRIEST.

Witnesses:
RALPH H. CUTTER,
W. M. MORRILL.